US008358606B2

(12) United States Patent
Seok

(10) Patent No.: US 8,358,606 B2
(45) Date of Patent: Jan. 22, 2013

(54) METHOD AND APPARATUS FOR PROCESSING MULTICAST FRAME

(75) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 278 days.

(21) Appl. No.: 12/759,388

(22) Filed: Apr. 13, 2010

(65) Prior Publication Data
US 2010/0260091 A1 Oct. 14, 2010

Related U.S. Application Data

(60) Provisional application No. 61/169,294, filed on Apr. 14, 2009.

(30) Foreign Application Priority Data

Nov. 3, 2009 (KR) .................. 10-2009-0105299

(51) Int. Cl.
*H04H 20/71* (2008.01)
(52) U.S. Cl. ..................................... 370/312
(58) Field of Classification Search .............. 370/311, 370/395.53, 469, 389
See application file for complete search history.

(56) References Cited

U.S. PATENT DOCUMENTS

| 7,898,996 B2* | 3/2011 | Sim et al. ............ 370/311 |
| 2007/0258466 A1* | 11/2007 | Kakani .............. 370/395.53 |
| 2008/0205385 A1* | 8/2008 | Zeng et al. ............ 370/389 |
| 2009/0052467 A1* | 2/2009 | Kaidar et al. .......... 370/469 |

FOREIGN PATENT DOCUMENTS

JP 2009-49635 A 3/2009

OTHER PUBLICATIONS

Jetcheva et al., "Adaptive Demand-Driven Multicast Routing in Multi-Hop Wireless Ad Hoc Networks," MobiHOC, ACM, 2001, pp. 33-44.
Lee et al., "A Performance Comparison Study of Ad Hoc Wireless Multicast Protocols," IEEE INFOCOM 2000, IEEE, 2000, pp. 565-574.

* cited by examiner

*Primary Examiner* — Andrew Lai
*Assistant Examiner* — Syed M Bokhari
(74) *Attorney, Agent, or Firm* — Birch, Stewart, Kolasch & Birch, LLP

(57) ABSTRACT

A method of processing a multicast frame in a wireless local area network (WLAN) and an apparatus supporting the method are provided. The method comprises receiving, at a station, a unicast frame from an access point (AP), the unicast frame including an unicast address indicating a single station which receives the unicast frame, receiving a multicast frame from the AP, the multicast frame including a group address indicating a group of stations which receives the multicast frame, determining whether the unicast frame is duplicated with the multicast frame, and discarding the multicast frame if the unicast frame is duplicated with the multicast frame.

10 Claims, 9 Drawing Sheets

FIG. 4

| oder | Information |
|---|---|
| 1 | Category | ~410 |
| 2 | Action | ~420 |
| 3 | Dialog Token | ~430 |
| 4 | Request Type | ~440 |
| 5 | DMS Descriptor List | ~450 |

FIG. 6

| Orfer | Information |
|---|---|
| 1 | Category | ~610
| 2 | Action | ~620
| 3 | Dialog Token | ~630
| 4 | DMS Status List | ~640

METHOD AND APPARATUS FOR PROCESSING MULTICAST FRAME

CROSS-REFERENCE TO RELATED APPLICATIONS

This application claims the benefit of priority of U.S. Provisional application No. 61/169,294 filed on Apr. 14, 2009, and Korean Patent Application No. 10-2009-0105299 filed on Nov. 3, 2009 all of which are incorporated by reference in their entirety herein.

BACKGROUND OF THE INVENTION

1. Field of the Invention

The present invention relates to a wireless local area network (WLAN), and more particularly, to a technique for processing a multicast frame in a WLAN system.

2. Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g implements the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. A very high throughput (VHT) WLAN system is one of IEEE 802.11 WLAN systems which have recently been proposed to support a data processing rate of above 1 Gbps. The VHT system is named arbitrarily. To provide a throughput of above 1 Gbps, a feasibility test is currently being conducted for the VHT system using 4×4 MIMO and a channel bandwidth of above 80 MHz.

As a mechanism for achieving a throughput of above 1 Gbps for the VHT WLAN, two methods are currently discussed, that is, a method+of using a band below 6 GHz and a method of using a band of 60 GHz. Among them, the method of using a channel of the band of 60 GHz is drawing more attention. This is caused by the fact that a channel using the band below 6 GHz is in use also by other wireless communication systems and thus available radio resources are limited. Such a disadvantage can be overcome by using a channel with the band of 60 GHz. However, the band of 60 GHz has a demerit in that its service coverage is narrower than that of the band below 6 GHz according to a feature of high frequency. Therefore, there is a need for a method for solving the problem of the narrow service coverage in a VHT WLAN system using the band of 60 GHz.

Meanwhile, data transmission of the WLAN system can be classified into unicast, multicast, and broadcast according to the number of target devices or destination devices. Unlike in the unicast where a destination device of transmit (Tx) data is a single terminal, the destination device of the Tx data is a plurality of terminals in the multicast and the broadcast.

In the multicast, a target address or a destination address of a Tx frame is specified as a multicast group address. The broadcast is special multicast in which the multicast group address specifies all terminals. Therefore, when simply referred to as 'multicast' in the following description, it will be interpreted such that 'broadcast' is also included unless it is not allowed by nature.

Multicast transmission delivers a single data stream simultaneously to a plurality of destination terminals, and thus data traffic can be reduced and a channel can be effectively used. Such multicast can be useful to provide a variety of information such as various applications, e.g., video conference, corporate communication, distance learning, software distribution, stock quotes, news, etc. Further, the multicast can also be used for a game played by multiple users over a wireless home network or for an application which shares streaming data.

The multicast is based on the concept of a multicast group, that is, a group of recipient terminals having an interest in a specific data stream. The terminals having an interest in receiving data to be multicast have to be first registered to the multicast group in order to receive the data. In a medium access control (MAC) layer, the multicast group is specified by a multicast MAC address. In general, a higher layer than the MAC layer takes a charge of generation, registration, deregistration, and change of the multicast group. Those issues of generation, registration, or the like of the multicast group specified by the MAC address are irrelevant to the present invention, and thus description thereof will be omitted.

In multicast transmission, it is difficult to confirm whether a terminal registered to a specific multicast group, i.e., a destination terminal, has successfully received all pieces of data provided from a source terminal. In particular, the IEEE 802.11 standard neither specifies an error recovery mechanism for multicast traffic nor provides any definition on a method capable of avoiding collision between a multicast frame and another frame. Therefore, a current multicast service does not guarantee that the destination terminal can completely and reliably receive data to be multicast.

A method of using an adaptive modulation scheme is taken into consideration as one method of ensuring reliability of multicast transmission. According to the adaptive modulation scheme, multicast transmission is achieved by a lowest modulation scheme available so that all terminals registered to a corresponding multicast group can receive a multicast frame. However, the use of a low modulation scheme results in deterioration of a data transfer rate, which may impair improvement of a data throughput of a WLAN system. Accordingly, there is a need for researches on a technique capable of ensuring QoS and reliability of multicast frame transmission without additional adverse effects.

SUMMARY OF THE INVENTION

The present invention provides a multicast frame processing method capable of not only extending service coverage but also ensuring reliability of multicast transmission.

The present invention also provides a multicast frame processing method used in a wireless local area network (WLAN) and capable of not only ensuring reliability of multicast transmission by considering a location of a terminal receiving a multicast frame but also achieving a high data transfer rate of an overall system.

The present invention also provides a method of solving a problem of receiving a data frame in duplication in the aforementioned processes to improve memory usage efficiency of a station and to avoid an overload.

In an aspect of the present invention, a method of processing a multicast frame in a wireless local area network (WLAN) include receiving, at a station, a unicast frame from an access point (AP), the unicast frame including an unicast address indicating a single station which receives the unicast frame, receiving a multicast frame from the AP, the multicast frame including a group address indicating a group of stations which receives the multicast frame, determining whether the unicast frame is duplicated with the multicast frame, and discarding the multicast frame if the unicast frame is duplicated with the multicast frame.

The method may further include initiating a the directed multicast service (DMS) in which at least one multicast frame is transmitted as at least one unicast frame by the AP before receiving the unicast frame and the multicast frame, and terminating DMS after receiving the multicast frame and the unicast frame.

The step of initiating the DMS may include transmitting a request message for requesting the DMS to the AP, and receiving a response message from the AP in response to the request frame.

The step of terminating the DMS may include receiving a termination message indicating a termination of DMS from the AP.

The step of terminating the DMS may further include transmitting a termination request message to request the termination of DMS.

The termination message may include a sequence control field which is used to determine whether the unicast frame is duplicated with the multicast frame.

The sequence control field may include a sequence number of a last multicast frame which the AP converts to a unicast frame.

It may be determined that the unicast frame and the multicast frame are duplicated if the unicast frame is a last unicast frame in the DMS and the sequence number in the sequence control field corresponds with a sequence number of the multicast frame.

In another aspect of the present invention, a wireless apparatus for processing a multicast frame in a wireless local area network (WLAN) includes a radio frequency (RF) unit and a processor operatively coupled to the RF unit and configured to receive, at a station, a unicast frame from an access point (AP), to receive a multicast frame from the AP, to terminate the DMS after receiving the multicast frame and the unicast frame, to determine whether the unicast frame is duplicated with the multicast frame, and to discard the multicast frame if the unicast frame is duplicated with the multicast frame.

The processor may be configured to initiate a directed multicast service (DMS) in which at least one multicast frame is transmitted as at least one unicast frame by the AP before receiving the unicast frame and the multicast frame, and to terminate the DMS after receiving the multicast frame and the unicast frame.

The processor may be configured to initiate the DMS by transmitting a request message for requesting the DMS to the AP and receiving a response message from the AP in response to the request frame.

The processor may be configured to terminate the DMS by receiving a termination message indicating a termination of DMS from the AP.

The termination message may include a sequence control field which is used to determine whether the unicast frame is duplicated with the multicast frame.

The sequence control field may include a sequence number of a last multicast frame which the AP converts to a unicast frame.

The processor may be configured to determine that the unicast frame and the multicast frame are duplicated, if the unicast frame is a last unicast frame in the DMS and the sequence number in the sequence control field corresponds with a sequence number of the multicast frame.

In still another aspect of the present invention, an access point (AP) for supporting a directed multicast service (DMS) in a wireless local area network (WLAN) includes a radio frequency (RF) unit and a processor operatively coupled to the RF unit, wherein the processor is configured for initiaing a DMS, transmitting an unicast frame, the unicast frame including an unicast address indicating a single station, wherein a multicast frame is converted into the unicast frame, and transmitting a termination message to terminate the DMS, wherein the termination message includes a sequence control field which is used for the single station to determine whether the unicast frame is duplicated with the multicast frame.

The sequence control field may include a sequence number of a last multicast frame which the processor converts to an unicast frame.

BRIEF DESCRIPTION OF THE DRAWINGS

FIG. 4 shows a DMS request message transmitted according to an embodiment of the present invention.

FIG. 6 shows a DMS response message transmitted according to an embodiment of the present invention.

DESCRIPTION OF EXEMPLARY EMBODIMENTS

Hereinafter, embodiments of the present invention will be described with reference to the accompanying drawings. Embodiments of the present invention described below can be effectively applied to a very high throughput (VHT) wireless local area network (WLAN) system operating in a band of 60 GHz. However, the present invention is not limited thereto. For example, the embodiments of the present invention can be also equally applied to a VHT WLAN system operating in a band below 6 GHz.

Figure 1:
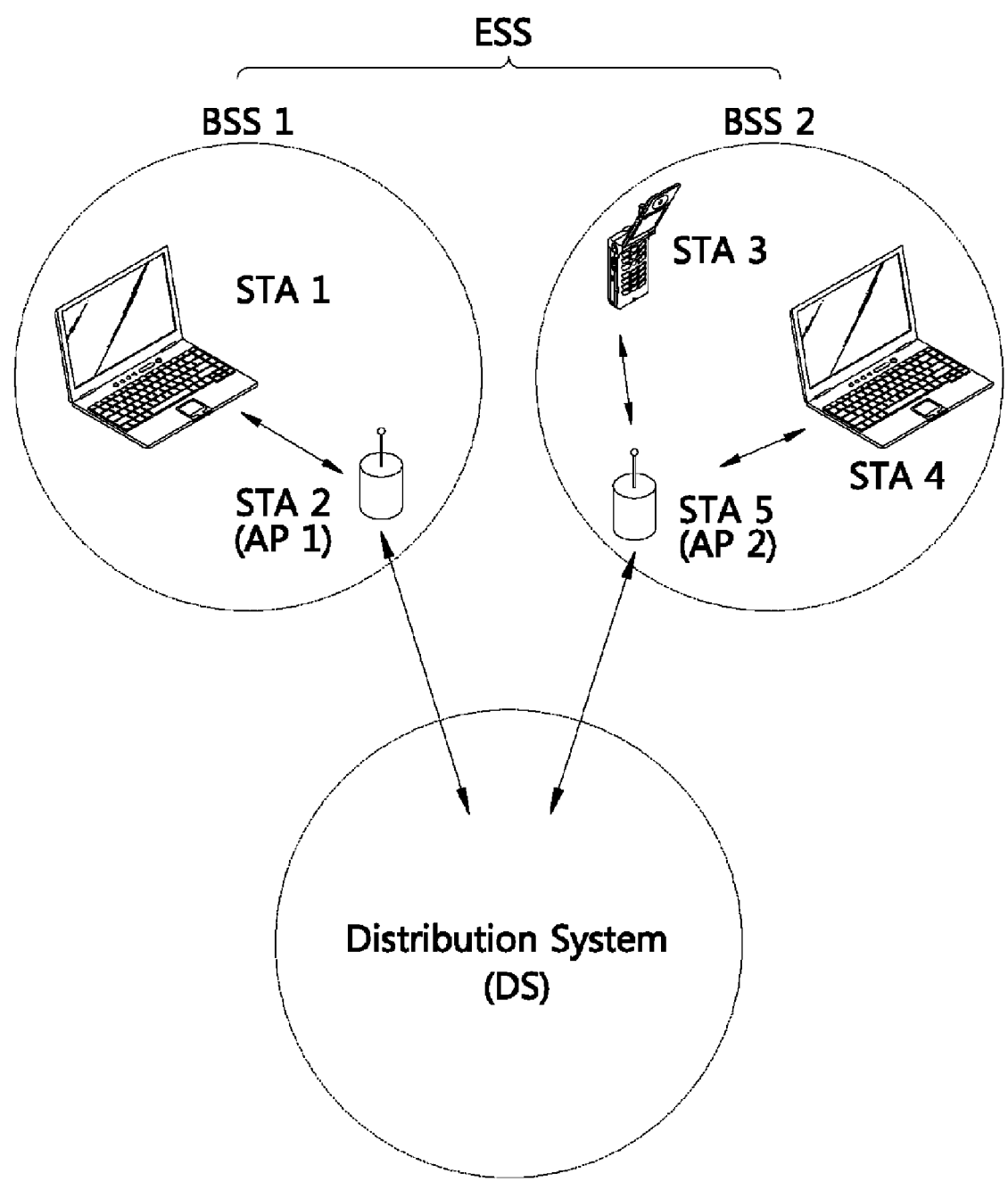
FIG. 1 is a schematic view showing an exemplary structure of a WLAN system to which an embodiment of the present invention can be applied.

FIG. 1 is a schematic view showing an exemplary structure of a WLAN system to which an embodiment of the present invention can be applied.

Referring to FIG. 1, the WLAN system includes one or more basis service sets (BSSs). The BSS is a set of stations (STAs) which are successfully synchronized to communicate with one another, and is not a concept indicating a specific region. The BSS can be classified into an infrastructure BSS and an independent BSS (IBSS). The infrastructure BSS is shown in FIG. 1. Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since connection to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. A VHT STA is defined as an STA that supports super high-rate data processing of above 1 GHz in the multi-channel environment to be described below. In the VHT WLAN system to which the embodiment of the present invention is applicable, STAs included in the BSS may be all VHT STAs, or a VHT STA and a legacy STA (i.e., IEEE 802.11n-based HT STA) may coexist.

Among the STAs, non-AP STAs (i.e., STA1, STA3, STA4, STA6, STA7, and STA8) are portable terminals operated by users. A non-AP STA may be simply referred to as an STA. The non-AP STA may also be referred to as a wireless transmit/receive unit (WTRU), a user equipment (UE), a mobile station (MS), a mobile terminal, a mobile subscriber unit, etc. A non-AP VHT-STA (or simply a VHT STA) is defined as a non-AP STA that supports the super high-speed data processing of above 1 GHz in the multi-channel environment to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-speed data processing of above 1 GHz in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical structure for interconnecting APs.

In a case where a VHT AP and/or a VHT STA use an omni-directional antenna in the VHT WLAN system, a problem may arise in that transmission reliability cannot be ensured in multicast transmission. The reason above is that, when multicast transmission is used under the premise that a plurality of VHT STAs simultaneously receive data, the plurality of VHT STAs are located in several places in a distributed manner and thus some VHT STAs may be located in a transmitter device (e.g., VHT AP) for multicasting a media stream whereas some other VHT STAs may be located in a long distance from each other.

As described above, due to narrow service coverage of the VHT WLAN system, it is very difficult to ensure transmission reliability of a multicast media stream when the VHT STA is located far from the VHT AP (i.e., transmitter device) or when the VHT STA is located in a non-line of sight (NLOS) area of the VHT AP. Such a problem is a significant issue when the VHT WLAN system operates in the band of 60 GHz due to its narrow service coverage. The same problem may also occur when the VHT WLAN system operates in the band below 6 GHz.

To solve such a problem, a method of transmitting a multicast frame by converting a part or entirety of the multicast frame into a unicast frame is proposed in an embodiment of the present invention. A method of transmitting a converted frame according to the embodiment of the present invention will be described below with reference to FIG. 2 and subsequent Figures.

Meanwhile, a multicast service will be described hereinafter by taking a VHT WLAN system for example, and the following aspects are assumed in the embodiment of the present invention described below.

First, a device for transmitting a media stream to be multicast, e.g., a VHT AP, supports transmission using a directional antenna (e.g., transmission using beamforming). This implies that the VHT AP can transmit a multicast stream in an omni-directional mode or a directional mode. When the VHT AP transmits the multicast stream in the omni-directional mode, VHT STAs adjacent to the VHT AP can successfully receive the multicast stream, whereas VHT STAs located in an NLOS area cannot successfully receive the multicast stream. On the other hand, when the VHT AP transmits the multicast stream in the directional mode, VHT STAs located in a corresponding direction as well as the VHT STAs located in the NLOS area can successfully receive the multicast stream.

According to the embodiment of the present invention, it is not necessary for the VHT STA receiving the multicast stream to support the directional antenna. That is, although some VHT STAs support reception using the directional antenna, other VHT STAs may not support the reception using the directional antenna. However, when the VHT AP transmits the multicast stream in the directional mode, the VHT STAs supporting the reception using the directional antenna can coordinate beamforming (BF) reception.

Under this assumption, the multicast frame can be transmitted and received according to four transmission/reception modes as following: 1) transmission in the omni-directional mode and reception in the omni-directional mode; 2) transmission in the omni-directional mode and reception in the directional mode; 3) transmission in the directional mode and reception in the omni-directional mode; and 4) transmission in the directional mode and reception in the directional mode. The VHT WLAN system can use any one of the four transmission/reception modes or two or more combinations of the four modes. According to the embodiment of the present invention, transmission in the omni-directional mode and transmission in the directional mode are both used together in order to extend service coverage of multicast transmission and to ensure transmission reliability. In addition, VHT STAs receiving the multicast stream preferably coordinate the reception mode according to the transmission mode, but the present invention is not limited thereto.

Figure 2:
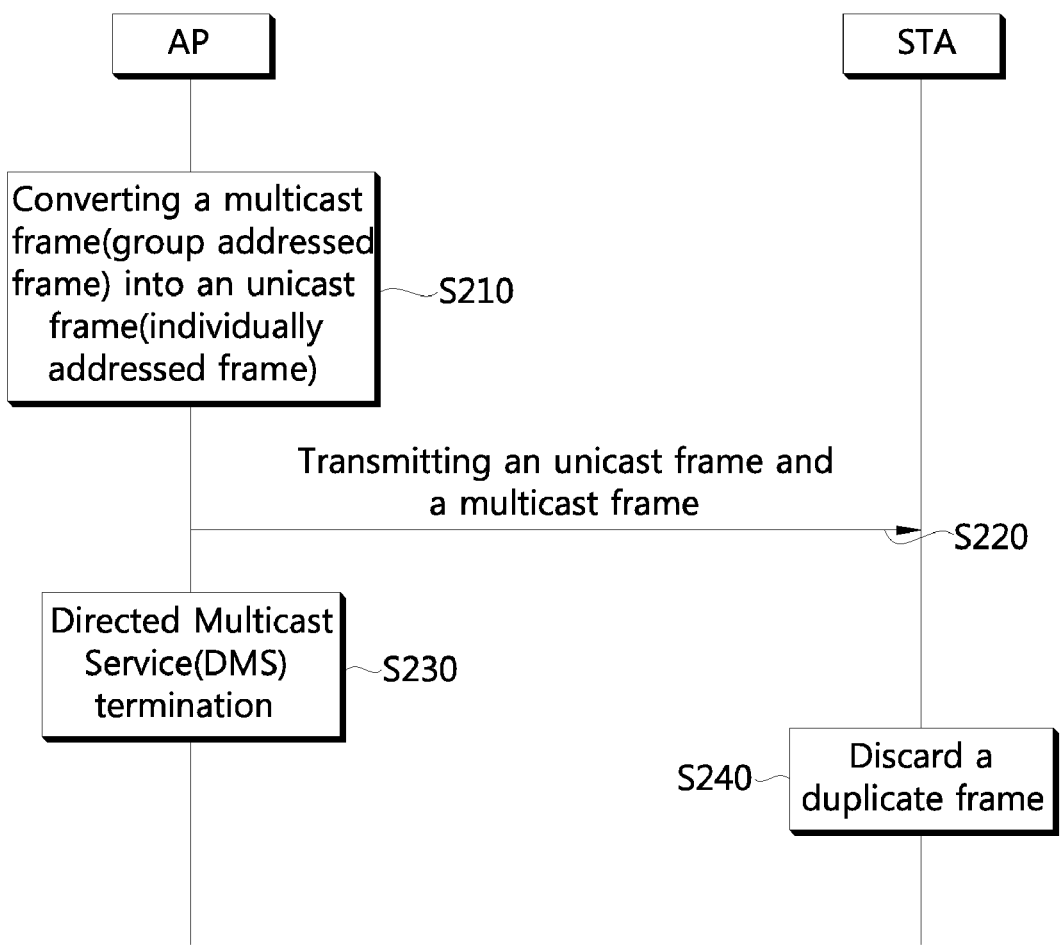
FIG. 2 is a flowchart showing a multicast frame processing method according to an embodiment of the present invention.

FIG. 2 is a flowchart showing a multicast frame processing method according to an embodiment of the present invention.

An AP may convert a frame to be transmitted by multicast into a unicast frame, and may simultaneously perform multicast and unicast with respect to one STA. In other words, a multicast transmission frame which is a group addressed frame may be transmitted as a unicast transmission frame which is an individually addressed frame, and an original frame to be transmitted by multicast may also be multicast. Hereinafter, the group addressed frame transmitted by multicast is referred to as a multicast frame, and the individually addressed frame transmitted by unicast is referred to as a unicast frame.

Unicast converting of the multicast frame may be performed at the request of the STA or by a decision or control of the AP. The embodiment of the present invention will be described by exemplifying a case of transmitting a multicast frame by the AP by performing unicast converting irrespective of a presence or absence of the request of the STA.

The AP converts a part of the multicast frame into a unicast frame in multicast transmission (step S210). Then, the STA receives the converted frame from the AP (step S220).

According to the embodiment of the present invention, the AP converts the multicast frame into the unicast frame, and transmits the unicast frame to STAs (i.e., multicast receivers) in a point-to-point manner. When using a unicast transmission mechanism, service coverage can be increased by using a directional antenna. In addition, when transmission is performed in a unicast manner, reliability of frame transmission can be increased by using acknowledgement.

However, when the multicast frame is transmitted by converting it into the unicast frame, mapping information between the multicast frame which is the original frame and the unicast frame which is the converted frame needs to be provided to the STA. If the mapping information is transmitted such that the original frame and the converted frame transmitted in duplication, one of the two frames is discarded to ensure a memory space and to avoid an overload. When the duplication occurs, since the multicast frame is the original frame and the unicast frame is the converted frame, the STA discards the original frame whereas the converted frame having higher reliability is left unchanged.

The AP starts a directed multicast service (DMS) with respect to a multicast group M. The multicast group M is a set of frames to be transmitted by multicast. The DMS is a service in which a multicast frame is transmitted as a unicast frame. More specifically, the DMS is defined as a service in which the AP transmits group addressed frames as individually addressed frames to the requesting non-AP STA. The DMS may also be referred to as unicast converting.

Hereinafter, multicast frames (i.e., original frames) are indicated by M1, M2, M3, and so on, and unicast frames obtained by performing unicast converting on these multicast frames are indicated by A1, A2, A3, and so on. 'An' or 'Mn' denotes a serial number or a sequence number. 'An' indicates a frame obtained by performing unicast converting on 'Mn'. A multicast frame and a unicast frame are mapped to each other when they have the same value n. That is, the sequence number is an order for transmitting respective frames or a number for identifying frames, and may be used as mapping information between the converted frame and the multicast frame.

Assume that the AP sequentially transmits A1, A2, M1, M2, A3, A4, A5, A6, M3, and M4 to the STA in step S220. Herein, the unicast frame A1 denotes a converted frame which has a sequence number 1 and which is to be transmitted to a specific STA by unicast. The frame M1 denotes a multicast frame having a sequence number 1, and is an original frame of A1. In addition, the unicast frames A1, A2, A3, and A4 are frames obtained by performing unicast converting on M1, M2, M3, and M4 belonging to the multicast group M for the DMS.

When the STA receives A1, A2, A3, and A4 by using the DMS, this leads to the same result as receiving M1, M2, M3, and M4. However, after reception of A1, A2, A3, and A4, the STA further receives M1, M2, M3, and M4 transmitted by multicast without performing unicast converting. This implies that the STA receives the same frame in duplication from the AP. That is, M1, M2, M3, and M4 transmitted by multicast correspond to duplicate frames.

To filter such duplicate frames, the STA must discard M1, M2, M3, and M4 transmitted by multicast during the DMS. However, if it is assumed that the AP terminates the DMS after the STA receives frames up to A1, A2, M1, M2, A3, and A4, the following problem occurs. By reference, the termination may be compulsively achieved by the AP, or may be achieved at the request of the STA.

Until the DMS is terminated, the STA can discard the duplicate frames by using mapping information even if the original frame (i.e., multicast frame) and the converted frame (i.e., unicast frame) are received in duplication. After the DMS is terminated, the STA cannot know mapping information of unicast frames with respect to frames transmitted by multicast and/or whether the frames are duplicated or not. Therefore, even in case of receiving M3 and M4 transmitted after A6, the STA cannot determine that these frames are duplicated with A3 and A4, and thus does not discard the frames. Herein, the multicast frames M3 and M4 are duplicated with the unicast frame A3 and A4, and thus have to be discarded.

In one method of solving the above problem, the AP may not terminate the DMS until all multicast frames corresponding to unicast frames are transmitted even if a DMS termination request is received or a situation of terminating the DMS occurs.

Therefore, the AP waits until all multicast and unicast frames which may be duplicated with each other are transmitted, and then terminates the DMS (step S230). That is, the AP maintains the DMS until M4 is transmitted, and terminates the DMS after all multicast frames corresponding to the converted frames are transmitted. After the DMS is terminated, the STA maps the multicast frames and the unicast frames, and discards the duplicate frames (step S240).

That is, the STA discards M1, M2, M3, and M4 which are transmitted during the DMS and which are duplicated with A1, A2, A3, and A4. That is, according to the aforementioned method, a problem of frame duplication can be solved by scheduling the DMS.

Figure 3:
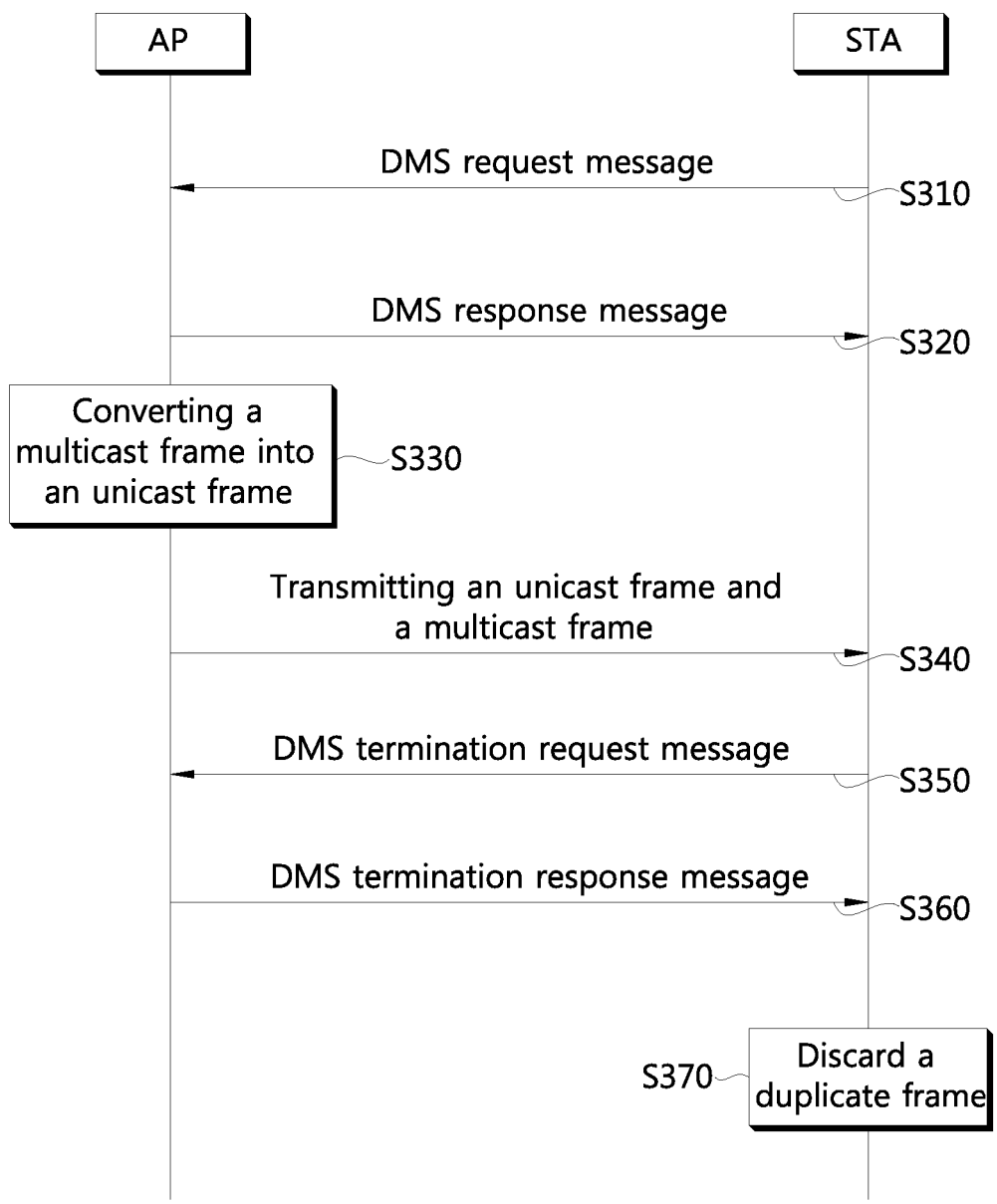
FIG. 3 is a flowchart showing a multicast frame processing method according to an embodiment of the present invention.

FIG. 3 is a flowchart showing a multicast frame processing method according to an embodiment of the present invention. An AP may convert a frame to be transmitted by multicast (hereinafter, referred to as a multicast frame) into a unicast frame, and may simultaneously perform multicast and unicast with respect to one STA.

A user or an STA may request the AP to convert the multicast frame into the unicast frame and to transmit the converted frame. As such, a case where the user or the STA requests the AP to perform unicast converting on the frame can be exemplified as a situation where reliability of frame transmission deteriorates temporarily or persistently due to multicast transmission or a situation where reliability of frame transmission is particularly required.

The unicast converting of the multicast frame may be performed at the request of the STA or by a decision or control of the AP.

Referring to FIG. 3, the STA transmits a DMS request message to the AP (step S310). The DMS request message is a message for requesting unicast converting of the multicast frame. When the AP allows unicast converting transmission, the AP transmits a DMS response message to the STA in response to the DMS request message (step S320). In this case, the DMS response message may be an unsolicited DMS response message transmitted by the AP to the STA without the request of the STA (i.e., without step S320). Thereafter, the AP converts some or all frames transmitted in downlink into unicast frames (steps S330 and S340). Herein, the STA may set a Quality of Service (QoS) expectation by using the DMS request. Setting of a desired QoS by using the DMS request message will be described below with reference to FIG. 4.

Data frames are transmitted, and thereafter the STA transmits a DMS termination request message to the AP (step S350). When the AP transmits a DMS termination response message to the STA (step S360), the DMS is terminated. The DMS may be terminated by a compulsory control of the AP without the request of the STA.

When the multicast frame is transmitted by being converted into the unicast frame in the DMS, as described above, there may be problem in which a duplicate frame is not detected due to an absence or shortage of sequence number mapping information between frames.

Therefore, if the DMS is terminated before transmission of the unicast-converted frame and the multicast frame is complete, the AP has to provide STAs with necessary information of the AP to detect duplication. The necessary information may include sequence number information of frames to be compared with each other to determine whether transmission is performed in duplication. Therefore, the AP can report sequence number information of a multicast frame, which is transmitted last by performing unicast converting before the DMS termination, to a corresponding STA.

When the DMS is terminated, the STA receiving the sequence number information from the AP compares a sequence number of the received multicast frames with the sequence number of the multicast frame which is transmitted last by performing unicast converting among converted frames transmitted after unicast converting. If a multicast frame having a sequence number smaller than that of the multicast frame last transmitted by performing unicast converting among the multicast frames is received before and after the DMS is terminated, such a multicast frame is transmitted in duplication with the converted frame. Therefore, the STA may regard the multicast frame having the smaller sequence number than that of the multicast frame last transmitted by performing unicast converting as a duplicate frame, and thus may discard the multicast frame.

Regardless of whether the termination is performed at the request of the STA or by the AP without the request of the STA, the DMS termination response message includes final sequence number information of the multicast frame last transmitted by performing unicast converting. The final sequence number information is sequence information of an original frame of a last frame among previously transmitted converted frames. If a frame of a previous sequence is transmitted by multicast, the STA may regard the frame as a duplicate frame. Even if more multicast frames are transmitted after the DMS is terminated, the STA may select and discard multicast frames received in duplication according to the final sequence number information (step S370).

For example, it is assumed that, right before the DMS termination, converted frames transmitted after being converted into unicast frames are A1, A2, A3, and A4, and multicast frames transmitted are M1 and M2. M1 and M2 are multicast frames corresponding to original frames of A1 and A2. In this case, in the embodiment described with reference to FIG. 2, the AP has to terminate the DMS after transmission of M3 and M4 is complete. By doing so, mapping information can be prevented from being lost. However, in the embodiment described with reference to FIG. 3, the AP provides the STA with the final sequence number information. In the present example, since the multicast frame last transmitted by performing unicast converting is M4, the AP provides the STA with a sequence number 4 as the final sequence number information. Then, even if M3 and M4 are transmitted after the DMS is terminated, the STA may regard these frames as duplicate frames, and thus may discard M3 and M4 received afterwards.

From the perspective of the STA, when the DMS starts, the STA receives a unicast frame and a multicast frame from the AP. In this case, the unicast frame is obtained by performing unicast converting on the multicast frame. To initiate the DMS, a DMS request message and a response message thereof may be exchanged between the STA and the AP. To terminate the DMS, a termination request message and a response message thereof may be exchanged between the STA and the AP, or a DMS termination message may be transmitted by the AP.

The STA determines whether the received unicast frame corresponds to a sequence number of the received multicast frame and thus determines whether duplication occurs. The STA may discard the multicast frame determined as a duplicate frame.

Regarding the multicast frame received after the DMS is terminated, a sequence number of a multicast frame transmitted last by performing unicast converting before the DMS termination is compared with a sequence number of the received multicast frame to determine whether it is a duplicate frame. Herein, the sequence number of the multicast frame transmitted last is included in the DMS termination message.

FIG. 4 shows a DMS request message transmitted according to an embodiment of the present invention. The DMS request message is a message for requesting frame converting transmission as described above. Further, the DMS request message may be used as a DMS termination request message according to a value set in a field of the DMS request message.

The DMS request message may use a format of a DMS request action frame. The DMS request action frame includes a category field 410, an action field 420, a dialog token field 430, a request type field 440, and a DMS descriptor list field 450.

The category field 410 indicates a category of the frame. The action field 420 indicates an operation to be performed by the frame. Herein, the action field 420 may indicate that the operation of the frame is related to a DMS request or termination. The dialog token field 430 is a field used to mutually matching a request and a response for the DMS request or a DMS termination request event. A value of the field may be selected by an entity for requesting the DMS or the DMS termination.

The request type field 440 indicates whether the frame is a DMS request message or a DMS termination request message. For example, if a field value of the request type field 440 is set to '1', the frame is the DMS request action frame, and if the field value of the request type field 440 is set to '0', the frame acts as the DMS termination request action frame.

The DMS descriptor list field 450 indicates detailed request content related to the DMS request or termination. The DMS descriptor list field 450 may include content related to the aforementioned QoS expectation requested for the AP by the STA. That is, each STA may set the QoS expectation for a multicast stream in the DMS by using the DMS descriptor list field 450 of the DMS request action frame. Details of the DMS descriptor list field 450 will be described below with reference to FIG. 5.

Figure 5:
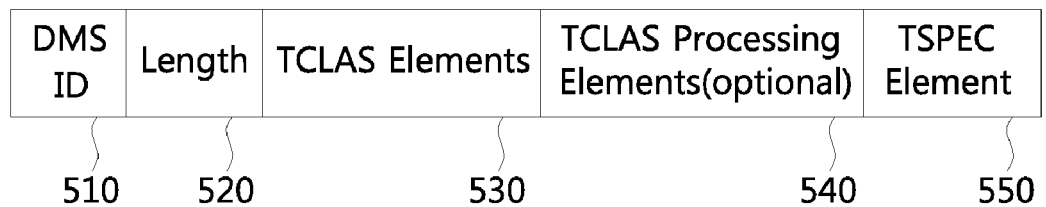
FIG. 5 shows the DMS descriptor list field of the DMS request message.

FIG. 5 shows the DMS descriptor list field 450 of the DMS request message of FIG. 4.

The DMS descriptor list field 450 of the DMS request action frame used as the DMS request message may include a DMS identifier (ID) field 510, a length field 520, a transmission class (TCLAS) element field 530, a TCLAS processing element field 540 (optional), a transmission specification (TSPEC) element field 550, etc. Further, the DMS descriptor list field 450 includes TCLAS information indicating a specific multicast group address for requesting the DMS, TSPEC information indicating QoS expectation information, etc. Among these information elements, the TCLAS information may include the TCLAS element field 530, the TCLAS processing element field 540, and the TSPEC information may be included in the TSPEC element field 550.

Therefore, in order for the STA to transmit the aforementioned QoS expectation to the AP, the DMS request action frame including the TSPEC element field 550 is transmitted to the STA when the DMS is requested. When a multicast stream is transmitted by the AP to the STA by performing unicast converting, the TSPEC element field 550 indicates QoS expectation information for transmission of the converted frame.

The AP may schedule the multicast frame on the basis of the TSPEC information of the TSPEC element field 550. That is, the AP may flexibly control transmission scheduling of respective multicast frames and/or converted frames by using various methods so as to satisfy QoS required by the STA.

For example, if a data rate (e.g., a minimum data rate, a mean data rate, a peak data rate, etc.) required by the STA is smaller than a transfer rate of the multicast frame, the AP may discard specific multicast frames from a buffer. In this case, the AP may preferentially transmit multicast frames, in particular, multicast frames having a greater effect on user quality.

FIG. 6 shows a DMS response message transmitted according to an embodiment of the present invention. As described above, the DMS response message is a message for responding to the DMS request or the frame converting request. Further, the DMS response message may be used as a DMS termination response message according to a value set in a field of the DMS response message.

The DMS response message may use a format of a DMS response action frame. The DMS response action frame may act as a DMS termination response message for a DMS termination request message according to a value set in a field of the DMS response action frame. Therefore, FIG. 6 may show a format of the DMS response action frame or a format of the DMS termination response action frame.

Descriptions on a category field 610 and an action field 620 are identical to those of the DMS request action frame or the DMS termination request action frame, and thus details thereof will be omitted. The same is also true for a dialog token field 630 which indicates a specific DMS request action frame or a specific DMS termination request action frame to which a specific response frame corresponds.

A DMS status list field 640 includes a status code. The status code indicates a response of the AP in response to the request of the STA, and may be set to a value of 'Accept' or 'Deny' according to whether the AP accepts/denies a DMS request or DMS termination request transmitted by the AP. In addition, the DMS status list field 640 may further include sequence number information.

When the AP terminates the DMS, the AP may provide information on the DMS status to the STA at the time of termination. This information is included in the DMS status list field 640. According to the embodiment of the present invention, an example of information included in the DMS status list field 640 is either sequence number information corresponding to previously transmitted frames or final sequence number information. Details of the DMS status list field 640 will be described below with reference to FIG. 7.

Figure 7:
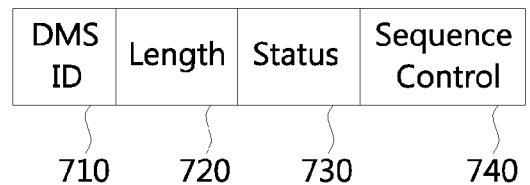
FIG. 7 shows the DMS status list field of the DMS response message

FIG. 7 shows the DMS status list field 640 of the DMS response message of FIG. 6.

The DMS status list field 640 may include a DMS ID field 710, a length field 720, a status field 730, a sequence control field 740, etc. The DMS ID field 710 includes information for identifying for which DMS a specific frame or a specific field is provided. The length field 720 indicates length information of the frame or the field. The status field 730 may indicate information related to a status of a DMS or a DMS termination event, for example, information on a termination success, failure, etc.

The sequence control field 740 includes sequence number information or final sequence number information. The sequence number information is information for matching a received converted frame and a multicast frame which is an original frame of the converted frame. By matching the converted frame and the multicast frame corresponding to the converted frame according to the sequence number information, it can be known whether reception is duplicated. Therefore, if the sequence number information is provided from an AP by using the sequence control field 740, an STA may discard the duplicated multicast frame by matching the converted frame and the multicast frame.

Alternatively, if the final sequence number information is included in the sequence control field 740, whether duplication occurs can be determined by simply comparing a magnitude of a sequence number instead of performing a matching operation. With respect to the final sequence number information which is sequence number information of the converted frame finally transmitted before the DMS is terminated, it can be determined that a multicast frame corresponding to a sequence number prior to the final sequence number is transmitted in duplication. Through the aforementioned process, the STA discards the multicast frame transmitted in duplication with the converted frame among the received multicast frames.

Figure 8:
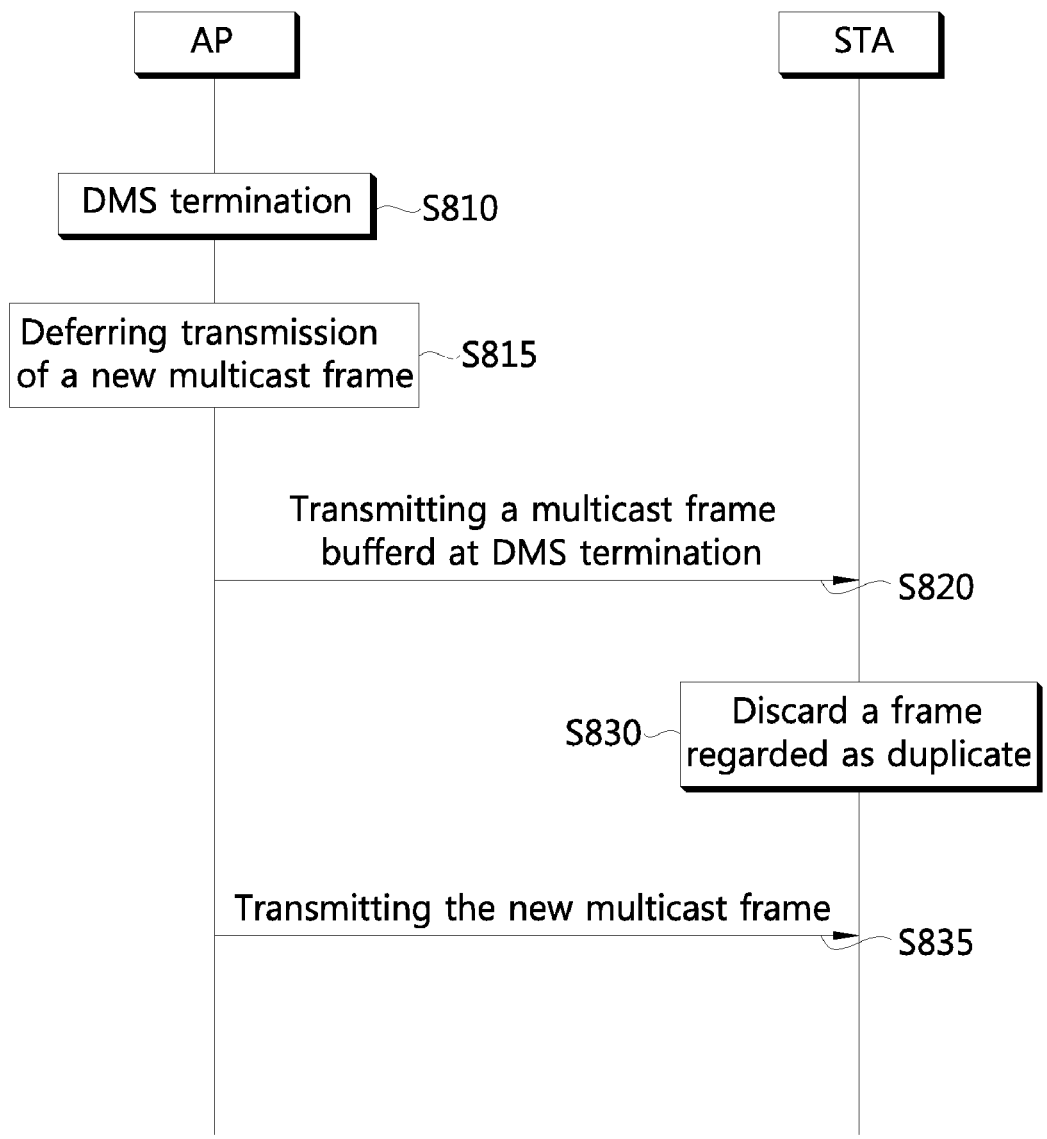
FIG. 8 is a flowchart showing a method of discarding a multicast frame received in duplication according to another embodiment of the present invention.

FIG. 8 is a flowchart showing a method of discarding a multicast frame received in duplication according to another embodiment of the present invention.

After a DMS is terminated (step S810), an AP transmits to an STA a multicast frame buffered in the AP at the DMS termination (step S820). The STA receiving the multicast frame after the DMS is terminated discards a frame when it is regarded as a duplicate frame (step S830). After completely transmitting all multicast frames buffered in the AP at the DMS termination, the AP may transmit a new multicast frame (step S835). In this case, the AP may defer transmission until the multicast frames buffered at the DMS termination are completely transmitted (step S815).

In step S830 of discarding the frame regarded as the duplicate frame, the STA discards the frame according to discard indication information included in the received multicast frame. The discard indication information may be included in various forms in the multicast frame. For example, a value of a more data field which is a subfield of a frame control field of the multicast frame may be utilized as the discard indication information.

Until a multicast frame in which the more data field of the multicast frame is set to '0' is received, the STA regards all multicast frames as duplicate frames, and thus discards the multicast frames. That is, a multicast frame received after reception of the multicast frame in which the more data field of the multicast frame is set to '0' is not discarded.

In an IEEE 802.11 frame structure, a more data field which is a subfield of a frame control field has a length of 1 bit and serves to indicate that data to be transmitted to a receiving STA is buffered in the AP. If the more data field is '1' in the multicast frame, it indicates that the AP has an additional multicast frame to be transmitted, and if the more data field is '0', it indicates that the multicast frame to be transmitted to the STA does not remain in the AP. In the embodiment of the present invention, transmitting of the multicast frame in which the more data field is '0' implies that the AP has no more original frames transmitted using the DMS.

For explanation of the aforementioned method, it is assumed that the AP starts the DMS to transmit A1, A2, M1, A3, A4, M2, M3, and M4 in sequence to the STA. When the DMS is terminated in a situation where the AP transmits frames up to A3, the AP multicasts the non-transmitted multicast frames M2, M3, and M4 to the STA. In this case, the AP transmits the frames by setting more data fields of the frames M2 and M3 to '1' and a more data field of the frame M4 to '0'. The STA receiving these frames discards received multicast frames by regarding them as duplicate frames according to the more data field values of M2, M3, and M4 received after the DMS termination. In the present example, all multicast frames received before reception of M4 transmitted by setting its more data field to '0' are regarded as duplicated multicast frames, and thus the multicast frames are discarded. In this case, the AP defers transmission of a new multicast frame to be transmitted until all buffered multicast frames to be transmitted at the DMS termination are transmitted (i.e., buffering is not performed). Even if the AP has to multicast M5 after M4, the AP defers transmission of M5 until the multicast frames M2, M3, and M4 buffered at the DMS termination are completely transmitted, and transmits M5 after transmission of M4.

According to another method of discarding a multicast frame received in duplication according to an embodiment of the present invention, the STA discards all multicast frames received during a specific time period after the DMS termination. This is because the multicast frame received within a specific time period after the DMS termination may be a multicast frame received in duplication. In this case, the specific time period may be a value determined in a management information base (MIB) or a value reported to the STA after determined by the AP. For example, the specific time period may be set to a time until a delivery traffic indication message (DTIM) is received after the DMS termination.

Figure 9:
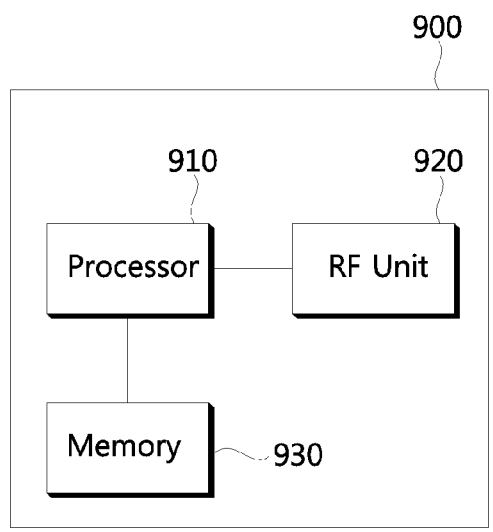
FIG. 9 is a block diagram of a wireless communication apparatus for performing a multicast frame processing method according to an embodiment of the present invention.

FIG. 9 is a block diagram of a wireless communication apparatus for performing a multicast frame processing method according to an embodiment of the present invention.

The wireless communication system according to the embodiment of the present invention transmits a frame by performing frame conversion in a WLAN system, and includes a processor 910, a radio frequency (RF) unit 920, and a memory 930. That is, the wireless communication apparatus of FIG. 9 can perform and terminate a DMS.

A user equipment includes the processor 910 and the RF unit 920. The memory 930 is coupled to the processor 910, and stores a variety of information for driving the processor 910. The memory 930 may include a read-only memory (ROM), a random access memory (RAM), a flash memory, a memory card, a storage medium, and/or other equivalent storage devices. Although not shown, the wireless communication system may further include a display unit and a user interface, and detailed descriptions thereof will be omitted.

The processor 910 may include an application-specific integrated circuit (ASIC), a separate chipset, a logic circuit, a data processing unit, and/or an RF unit for mutually converting a baseband signal and a radio signal. Herein, for a directed multicast service (DMS), the processor 910 may generate a converted frame obtained by converting a multicast frame into a unicast frame. Each of the multicast frame and the converted frame has a sequence number. The sequence number may be used as mapping information of the multicast frame and the converted frame.

That is, an STA can know the converted frame and the multicast frame corresponding to an original frame of the converted frame by using the sequence information, and thus can determine whether the frame is transmitted in duplication. In particular, when the STA is provided with final sequence number information which is sequence number information of a converted frame last transmitted before DMS termination, the STA may discard all multicast frames determined as duplicate frames according to the final sequence number information.

In addition, in order to avoid mapping information between the converted frame and the multicast frame from being lost due to the DMS termination, the processor 910 may schedule the DMS in a manner that the DMS is not terminated until completion of transmission of multicast frames corresponding to the original frames of the previously transmitted converted frames.

The RF unit 920 transmits and receives a DMS request message, a DMS response message, a DMS termination request message, a DMS termination message, or a DMS termination response message to and from the STA, and transmits the converted frame generated by the processor 910 and the multicast frame to the STA. Further, if the DMS is terminated, the RF unit 920 transmits the sequence number information to the STA. The sequence number information may be transmitted by being included in the DMS termination message or the DMS termination response message.

When the STA regards the multicast frame corresponding to the original frame of the converted frame as a duplicate frame and thus intends to discards the multicast frame as described above, the sequence number information is information used to select the multicast frame to be discarded.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

According to the present invention, a wireless local area network (WLAN) system can not only extend service coverage but also ensure reliability of multicast transmission. In addition, a method of solving a problem of receiving a data frame in duplication is provided to improve memory usage efficiency of a station and to avoid an overload.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of processing a multicast frame in a wireless local area network (WLAN), the method comprising:
   initiating a directed multicast service (DMS) in which at least one multicast frame is transmitted as at least one unicast frame by an access point (AP);
   receiving the at least one multicast frame from the access point (AP), the at least one multicast frame being transmitted as the at least one unicast frame;
   terminating the DMS by receiving a termination message indicating a termination of the DMS from the AP;
   after the termination of the DMS, determining whether a received multicast frame is duplicated with the at least one multicast frame; and
   discarding the received multicast frame if the multicast frame is duplicated with the at least one multicast frame,
   wherein the termination message includes a sequence control field, the sequence control field indicating a sequence number of a last multicast frame transmitted as a unicast frame, and
   wherein the determining whether the received multicast frame is duplicated is based on the sequence control field.

2. The method of claim 1, wherein the step of initiating the DMS includes:
   transmitting a request message for requesting the DMS to the AP; and
   receiving a response message from the AP in response to the request frame,
   wherein the request message includes at least one requested multicast group address for the DMS.

3. The method of claim 2, further comprising:
   acquiring mapping information related to at least one multicast address, the at least one multicast group address being accepted by the AP from the at least one requested multicast group address; and
   determining whether the received multicast frame is duplicated with the at least one multicast frame based on the mapping information, until the DMS is terminated.

4. The method of claim 3, wherein, if a multicast group address of the received multicast frame matches the at least one multicast group address, the received multicast frame is determined to have been duplicated.

5. The method of claim 1, wherein the received multicast is determined to have been duplicated when a sequence number of the received multicast frame is same to or smaller than the sequence number indicated by the sequence control field.

6. A wireless apparatus for processing a multicast frame in a wireless local area network (WLAN), the apparatus comprising:
   a radio frequency (RF) unit; and
   a processor operatively coupled to the RF unit and configured to:
      initiate a directed multicast service (DMS) in which at least one multicast frame is transmitted as at least one unicast frame by an access point (AP),
      receive the at least one multicast frame from the AP, the at least one multicast frame being transmitted as the at least one unicast frame,
      terminate the DMS by receiving a termination message indicating a termination of the DMS from the AP,
      after the termination of the DMS, determine whether a received multicast frame is duplicated with the at least one multicast frame, and
      discard the received multicast frame if the received multicast frame is duplicated with the at least one multicast frame,
      wherein the termination message includes a sequence control field, the sequence control field indicating a sequence number of a last multicast frame transmitted as a unicast frame, and
      wherein the determining whether the received multicast frame is duplicated is based on the sequence control field.

7. The wireless apparatus of claim 6, wherein the processor is configured to initiate the DMS by:
   transmitting a request message for requesting the DMS to the AP; and
   receiving a response message from the AP in response to the request frame,
   wherein the request message includes at least one requested multicast group address for the DMS.

8. The wireless apparatus of claim 6, wherein the processor is configured to:
  acquire mapping information related to at least on multicast group address, the at least one multicast group address being accepted by the AP from the at least one requested multicast group address, and
  determine whether the received multicast frame is duplicated with the at least one multicast frame based on the mapping information, until the DMS is terminated.

9. The wireless apparatus of claim 8, wherein the processor is configured to determine that the received multicast frame is duplicated if a multicast group address of the received multicast frame matches the at least one multicast group address.

10. The wireless apparatus of claim 6, wherein the processor is configured to determine that the received multicast frame is duplicated when a sequence number of the received multicast frame is same to or smaller than the sequence number indicated by the sequence control field.

* * * * *